(12) United States Patent
Mernyk et al.

(10) Patent No.: US 7,852,606 B2
(45) Date of Patent: Dec. 14, 2010

(54) SELF-TESTING CIRCUIT INTERRUPTING DEVICE

(75) Inventors: Ross Mernyk, Brooklyn, NY (US); Roger M. Bradley, North Bellmore, NY (US)

(73) Assignee: Leviton Manufacturing Company, Inc., Melville, NY (US)

( * ) Notice: Subject to any disclaimer, the term of this patent is extended or adjusted under 35 U.S.C. 154(b) by 0 days.

(21) Appl. No.: 11/466,744

(22) Filed: Aug. 23, 2006

(65) Prior Publication Data

US 2008/0013227 A1 Jan. 17, 2008

Related U.S. Application Data

(60) Provisional application No. 60/711,194, filed on Aug. 24, 2005.

(51) Int. Cl.
*H02H 3/05* (2006.01)
(52) U.S. Cl. ....................................................... 361/42
(58) Field of Classification Search ................... 361/42
See application file for complete search history.

(56) References Cited

U.S. PATENT DOCUMENTS

| | | | | |
|---|---|---|---|---|
| 1,770,398 | A | * | 7/1930 | Gallop et al. .................. 361/63 |
| 1,870,810 | A | * | 8/1932 | Hoard .......................... 307/102 |
| 1,967,110 | A | * | 7/1934 | Bergvall ....................... 361/66 |
| 2,309,433 | A | * | 1/1943 | Anderson .................... 361/44 |
| 3,252,086 | A | | 5/1966 | Lundstrom |
| 3,259,802 | A | * | 7/1966 | Steen ........................... 361/48 |
| 3,668,474 | A | | 6/1972 | Knox |
| 4,314,300 | A | * | 2/1982 | Griffith ......................... 361/13 |
| 4,455,654 | A | | 6/1984 | Bhaskar et al. |
| 4,707,759 | A | | 11/1987 | Bodkin |
| 4,742,422 | A | | 5/1988 | Tigges |
| 4,751,608 | A | | 6/1988 | Schultz |
| 5,136,458 | A | | 8/1992 | Durivage, III |
| 5,175,403 | A | * | 12/1992 | Hamm et al. ................ 218/120 |
| 5,202,662 | A | | 4/1993 | Bienwald et al. |
| 5,214,560 | A | | 5/1993 | Jensen |
| 5,270,900 | A | | 12/1993 | Alden et al. |
| 5,309,310 | A | | 5/1994 | Baer et al. |
| 5,386,183 | A | | 1/1995 | Cronvich et al. |
| 5,418,678 | A | * | 5/1995 | McDonald .................... 361/46 |
| 5,475,609 | A | | 12/1995 | Apothaker |
| 5,477,412 | A | | 12/1995 | Neiger et al. |
| 5,600,524 | A | | 2/1997 | Neiger et al. |

(Continued)

FOREIGN PATENT DOCUMENTS

CA 2383738 7/2000

(Continued)

OTHER PUBLICATIONS

International Search Report and the Written Opinion of the International Searching Authority mailed on Feb. 12, 2008 for PCT/US2007/070256 filed on Jun. 1, 2007. 3 pages.

*Primary Examiner*—Jared J Fureman
*Assistant Examiner*—Nicholas Ieva
(74) *Attorney, Agent, or Firm*—Collard & Roe, P.C.

(57) ABSTRACT

There is disclosed a self-testing circuit interrupting device which provides uninterrupted power to a load during a complete electronic and electromechanical components self test to allow autonomous periodic automated self testing without damaging or resetting connected load equipment.

8 Claims, 7 Drawing Sheets

U.S. PATENT DOCUMENTS

| | | | |
|---|---|---|---|
| 5,715,125 | A | 2/1998 | Neiger et al. |
| 5,784,753 | A * | 7/1998 | Kaczmarz et al. ............. 15/319 |
| 5,825,599 | A | 10/1998 | Rosenbaum |
| 5,875,087 | A | 2/1999 | Spencer et al. |
| 5,956,218 | A | 9/1999 | Berthold |
| 5,969,920 | A | 10/1999 | Mackenzie |
| 5,978,191 | A | 11/1999 | Bonniau et al. |
| 5,982,593 | A | 11/1999 | Kimblin et al. |
| 6,052,265 | A | 4/2000 | Zaretsky et al. |
| 6,052,266 | A | 4/2000 | Aromin |
| 6,111,733 | A | 8/2000 | Neiger et al. |
| 6,169,405 | B1 | 1/2001 | Baltzer et al. |
| 6,191,589 | B1 | 2/2001 | Clunn |
| 6,253,121 | B1 | 6/2001 | Cline et al. |
| 6,262,550 | B1 | 7/2001 | Kliman et al. |
| 6,262,871 | B1 | 7/2001 | Nemir et al. |
| 6,292,337 | B1 | 9/2001 | Legatti et al. |
| 6,370,001 | B1 | 4/2002 | Macbeth |
| 6,421,214 | B1 | 7/2002 | Packard et al. |
| 6,421,618 | B1 | 7/2002 | Kliman et al. |
| 6,426,632 | B1 | 7/2002 | Clunn |
| 6,426,634 | B1 | 7/2002 | Clunn et al. |
| 6,433,977 | B1 | 8/2002 | Macbeth |
| 6,437,700 | B1 | 8/2002 | Herzfeld et al. |
| 6,456,471 | B1 | 9/2002 | Haun et al. |
| 6,522,510 | B1 | 2/2003 | Finlay et al. |
| 6,532,424 | B1 | 3/2003 | Haun et al. |
| 6,538,863 | B1 | 3/2003 | MacBeth |
| 6,674,289 | B2 | 1/2004 | Macbeth |
| 6,683,158 | B2 | 1/2004 | Springer et al. |
| 6,789,209 | B1 | 9/2004 | Suzuki et al. |
| 6,807,035 | B1 | 10/2004 | Baldwin et al. |
| 6,807,036 | B2 | 10/2004 | Baldwin |
| 6,831,819 | B2 | 12/2004 | Nemir et al. |
| 6,856,498 | B1 | 2/2005 | Finlay, Sr. |
| 6,864,766 | B2 | 3/2005 | Disalvo et al. |
| 6,873,158 | B2 | 3/2005 | Macbeth |
| 6,980,005 | B2 | 12/2005 | Finlay, Sr. et al. |
| 7,079,363 | B2 * | 7/2006 | Chung ...................... 361/13 |
| 7,133,266 | B1 | 11/2006 | Finlay |
| 7,149,065 | B2 | 12/2006 | Baldwin et al. |
| 7,173,428 | B2 | 2/2007 | Hurwicz |
| 7,173,799 | B1 | 2/2007 | Weeks et al. |
| 7,177,129 | B2 | 2/2007 | Arenz et al. |
| 7,195,500 | B2 | 3/2007 | Huang et al. |
| 7,212,386 | B1 | 5/2007 | Finlay, Sr. et al. |
| 7,282,921 | B2 | 10/2007 | Sela et al. |
| 7,289,306 | B2 | 10/2007 | Huang |
| 7,295,415 | B2 | 11/2007 | Huang et al. |
| 7,372,678 | B2 | 5/2008 | Di Salvo et al. |
| 2002/0078511 | A1 | 6/2002 | Blair et al. |
| 2002/0181175 | A1 * | 12/2002 | Baldwin ...................... 361/42 |
| 2004/0252425 | A1 | 12/2004 | Baldwin et al. |
| 2005/0036250 | A1 | 2/2005 | Asano |
| 2005/0063109 | A1 | 3/2005 | Baldwin |
| 2005/0264427 | A1 | 12/2005 | Zeng et al. |
| 2006/0125622 | A1 | 6/2006 | Baldwin et al. |
| 2007/0014068 | A1 | 1/2007 | Huang et al. |
| 2007/0086127 | A1 | 4/2007 | Huang |
| 2007/0091520 | A1 | 4/2007 | Angelides et al. |
| 2007/0165342 | A1 | 7/2007 | Elms |
| 2007/0208520 | A1 | 9/2007 | Zhang et al. |
| 2007/0227506 | A1 | 10/2007 | Perryman et al. |
| 2007/0279814 | A1 | 12/2007 | Bonilla et al. |
| 2008/0002313 | A1 | 1/2008 | DiSalvo et al. |
| 2008/0007879 | A1 | 1/2008 | Zaretsky et al. |
| 2008/0013227 | A1 | 1/2008 | Mernyk et al. |
| 2008/0022153 | A1 | 1/2008 | Wang et al. |
| 2009/0040667 | A1 | 2/2009 | Disalvo et al. |
| 2009/0086389 | A1 | 4/2009 | Huang et al. |
| 2009/0086390 | A1 | 4/2009 | Huang |
| 2009/0161271 | A1 | 6/2009 | Huang et al. |

FOREIGN PATENT DOCUMENTS

| | | | |
|---|---|---|---|
| WO | WO/00/14842 | | 3/2000 |
| WO | WO 03/079031 | * | 9/2003 |
| WO | WO/2009/097469 | | 8/2009 |

* cited by examiner

SELF-TESTING CIRCUIT INTERRUPTING DEVICE

This application claims the benefit of U.S. Provisional Application No. 60/711,194 filed on Aug. 24, 2005.

FIELD OF THE INVENTION

The present invention is directed to the family of resettable circuit interrupting devices and systems which include, without limitation, ground fault circuit interrupters (GFCI's), arc fault circuit interrupters (AFCI's), immersion detection circuit interrupters (IDCI's), appliance leakage current interrupters (ALCI's), circuit breakers, contactors, latching relays and solenoid mechanisms. More particularly, the present application is directed to an autonomous periodic full function testing system for such devices and systems.

DESCRIPTION OF THE RELATED ART

The electrical wiring device industry has witnessed an increasing call for circuit breaking devices or systems which are designed to interrupt power to various loads, such as household appliances, consumer electrical products and branch circuits. In particular, electrical codes require electrical circuits in home bathrooms and kitchens to be equipped with ground fault circuit interrupters, for example. Presently available GFCI devices, such as the device described in commonly owned U.S. Pat. No. 4,595,894, use a trip mechanism to mechanically break an electrical connection between one or more input and output conductors. Such devices are resettable after they are tripped by, for example, the detection of a ground fault. In the device discussed in the '894 patent, the trip mechanism used to cause the mechanical breaking of the circuit (i.e., the connection between input and output conductors) includes a solenoid (or trip coil). A user controlled manually operated test button is used to test the trip mechanism and circuitry used to sense faults and a manually operated reset button is used to reset the electrical connection between input and output conductors.

However, instances may arise where an abnormal condition, caused by for example a lightening strike, occurs which may result not only in a surge of electricity at the device and a tripping of the device but also a disabling of the trip mechanism used to cause the mechanical breaking of the circuit. This may occur without the knowledge of the user. Under such circumstances an unknowing user, faced with a GFCI which has tripped, may press the reset button which, in turn, will cause the device with an inoperative trip mechanism to be reset without the fault protection available.

To insure that the devices are providing the protection that they are designed to provide, they should be tested by the user on a specific schedule and preferably every three or four weeks. This is not only impracticable for a home owner, but a very expensive, time consuming and difficult procedure in a building such as a hotel or large motel where each unit has a bathroom that is equipped with a GFCI which must be tested.

What is needed is a fault interrupter such as a GFCI which performs autonomous periodic automatic self testing without interrupting power to a connected load during these tests.

SUMMARY OF THE INVENTION

The present invention relates to resettable circuit interrupting devices, such as but not limited to GFCI devices that performs autonomous periodic automated self testing without interrupting power to a connected load if the test is passed and can include a reset lockout mechanism which prevents the resetting of electrical connections (or continuity) between input and output conductors if the circuit interrupter used to break the connection is non-operational or if an open neutral condition exists.

The circuit interrupting device includes an input conductive path and an output conductive path. The input conductive path is capable of being electrically connected to a source of electricity. The output conductive path is capable of conducting electrical current to a load when electrical continuity is established with the input conductive path. The device also includes a circuit interrupter configured to break electrical continuity between the input and output conductive paths in response to the occurrence of a predetermined condition. Said circuit interrupter may be comprised of electro-mechanical mechanisms, such as movable electrical contacts and solenoids, and/or of semiconductor type switching devices. Predetermined or predefined conditions can include, without limitations, ground faults, arc faults, appliance leakage current faults, immersion faults and a test cycle. The device also includes a microcontroller (or logic circuit) which evaluates the predefined conditions and determines whether or not to activate the circuit interrupter, performs self-tests on the device electronics and electro-mechanical components, and performs other typical logic functions.

In a first embodiment of the present invention, the circuit interrupter is comprised of two relays wired in parallel to provide power to the load. One relay is the main relay, which is normally energized and the other relay is the auxiliary relay which is energized only when a test is being performed. Each relay is electro-mechanically designed such that if its current carrying members are in the off position they cannot be in the on position, and sensors or additional relay contacts are employed to sense that the relay is in its off position.

A self test sequence is initiated by moving the auxiliary relay to its on position while the main relay is also in its on position. The main relay is then moved to its off position, verification that the main relay is in its off position is made, and then the main relay is restored to its on position. Finally, the auxiliary relay is restored back to its off position. Should any step fail, a self destruct mechanism is activated to permanently remove power to the load.

The auxiliary relay may be physically smaller than the main relay, as it need only carry current briefly. One or both of the relays may be under direct control of a fault detector, or they may be controlled by a microcontroller or logic circuit which has a fault detector as an input. To avoid accidental engagement of the auxiliary relay, its control circuit may employ an energy reservoir (such as a capacitor) which is charged slowly before engagement and which discharges quickly to maintain the auxiliary relay in a closed position.

In a second embodiment, a single relay is provided with two conducting positions (each connected to the same load) and a center-off position. This embodiment allows a single motion to both disconnect and re-connect power to the load, said single motion performed (by the microcontroller or logic circuit) proximate to the power line voltage zero cross. A self test sequence in this second embodiment consists of moving the relay contacts from one conducting position to the other. The slight abnormality of the voltage wave at the load should not disturb connected load equipment, but can be detected by sensors to verify proper relay operation.

The time delay between electronic activation of the relay and its eventual movement may be design characterized, factory calibrated, and/or automatically adaptively adjusted after installation. Together with a power line voltage zero cross detection circuit, relay movement timing can be precisely controlled to occur proximate to the zero cross. Damping means may be employed to reduce contact landing bounce.

LED emitter/detector pair, hall sensors, or the load voltage waveform itself may be employed to sense relay position. An additional load may be applied downstream of the relay mechanism, either briefly or continuously, to negate load capacitance while sensing load voltage.

In a third embodiment of the invention, a single relay and precise timing are employed. A self test sequence consists of causing a brief "hiccup" type of motion of the relay which will very briefly disconnect and immediately re-connect power to the load. This motion is preformed proximate to the power line voltage zero cross. The slight abnormality of the voltage waveform at the load should not cause any disturbance in connected equipment, but can be detected by sensors to verify proper relay operation.

It is to be noted that a continuously held relay at its near closed position may require a much greater closing force to be applied than the opening force that is required. This difference facilitates very brief disconnect times. Also, it should be noted that regardless of the style of relay used, relay electromechanical characteristics may require that the reconnect signal be applied to the relay even before the disconnect signal has caused a disconnect.

The time delay between electronic activation of the relay and its eventual movement may be design characterized, factory calibrated, and/or automatically adaptively adjusted after installation. Together with a power line voltage zero cross detection circuit, relay movement timing is precisely controlled to occur proximate to the zero cross. Damping means may be employed to reduce contact landing bounce.

LED emitter/detector pairs, hall sensors, or the load voltage waveform itself may be employed to sense the relay position. An additional load may be applied down stream of the relay mechanism, either briefly or continuously, to negate load capacitance while sensing load voltage.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. While the present invention is embodied in hardware, alternate equivalent embodiments may employ, whether in whole or in part, firmware and software. Those skilled in the art should also realize that such equivalent constructions do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference characters, wherein:

DETAILED DESCRIPTION

The present invention relates to resettable circuit interrupting devices, such as but not limited to GFCI devices that performs autonomous periodic automated self testing without interrupting power to a connected load if the test is passed.

Figure 1:
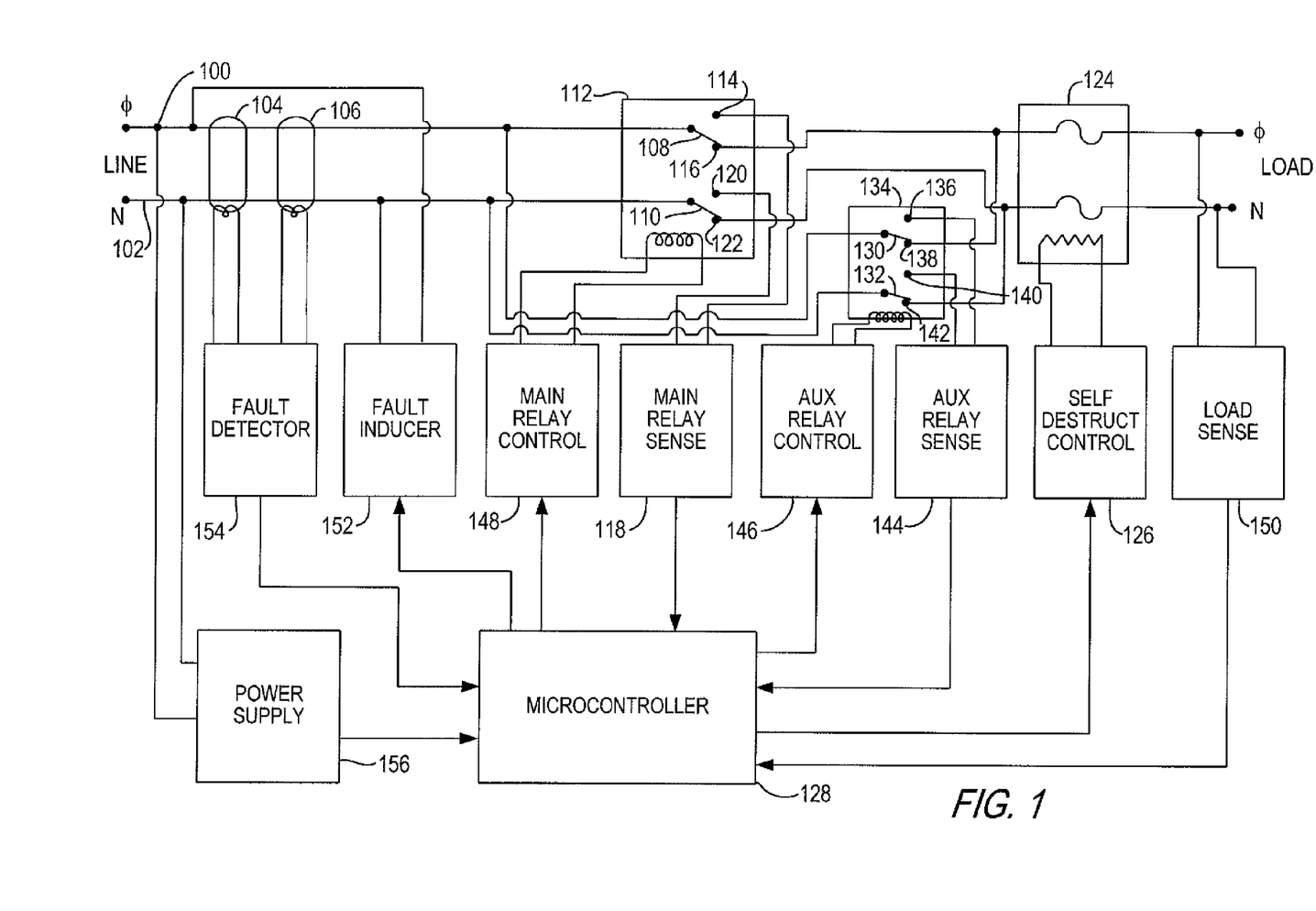
FIG. 1 is a block diagram of a first embodiment of structure in accordance with the principles of the invention.

Referring to FIG. 1, there is shown a block diagram of a first embodiment of structure to obtain autonomous periodic automated self testing of a circuit interrupting device. Line phase 100 and neutral 102 conductors are coupled through differential transformer 104, 106 to movable contacts 108, 110 of main relay 112 which is a double pole double throw relay. Stationary contacts 114, 116, which cooperate with movable contact 108, are coupled to main relay sense circuit 118 and the load phase terminal respectively. Stationary contacts 120, 122, which cooperate with movable contact 110, are coupled to main relay sense circuit 118 and the load neutral terminal respectively. Heat sensitive elements such as fuses 124 can be connected in series with the load phase and neutral conductors. Positioned in close proximity to the fuses is a heating element which is energized by self destruct control 126 which is connected to and controlled by microcontroller 128. The movable contacts 130, 132 of auxiliary relay 134, which is a double pole double throw relay are electrically connected to the movable contacts of main relay 112. Stationary contacts 136, 140 of relay 134 are connected to covering relay sense which is connected to the microcontroller to indicate the open/close state of the contacts of relay 134. Auxiliary relay control 146, which is selectively energized by microcontroller 128, controls the flow of current to the coil of auxiliary relay 134. Main relay control 148, which is selectively energized by microcontroller 128, controls the flow of current to the coil of main relay 112. Load sensor 150 is connected across the load phase and neutral conductors and is connected to indicate the presence or absence of voltage at the load conductors to microcontroller 128. A fault inducer 152 which is controlled by microcontroller 128 is connected to induce a fault in the line phase and/or neutral conductors for sensing by the differential transformers 104, 106. Fault detector 154 is connected to send a fault signal to microcontroller 128 upon sensing a fault in the differential transformers. Power supply 156 is provided to supply power to the microcontroller and each of the other circuits as required. Fuses 124 are used to disconnect the load from the line terminals.

Figure 2:
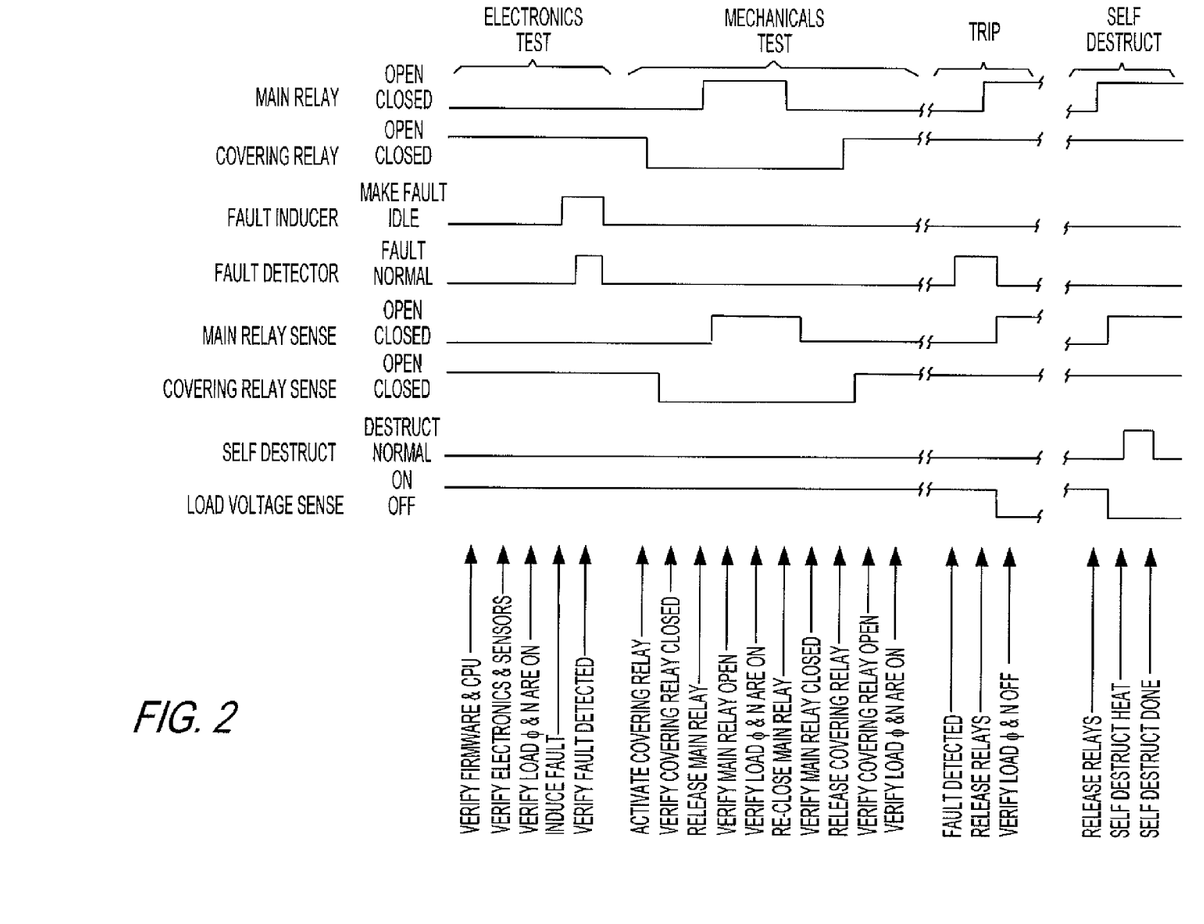
FIG. 2 is a chart of the sequence of events during operation of the autonomous periodic automated self test cycle of the embodiment of FIG. 1.

FIG. 2 is a chart of the sequence of events during operation of the autonomous periodic automated self test operation of the embodiment of FIG. 1. It is to be noted that FIG. 2 is self explanatory and, therefore, in the interest of brevity, the various steps of the cycle as shown in FIG. 2 will not be further described.

Continuing with FIGS. 1 and 2, the steps of the self test sequence is as follows;

Verify the fault detector is reporting no fault;

Induce a fault;

Verify the fault detector reports a fault;

Deactivate fault inducer;
Verify the fault detector no longer reports a fault;
Verify that the main relay is in its on position;
Verify that the auxiliary relay is in its off position;
Verify that load power is present;
Move auxiliary relay to its on position;
Verify that the auxiliary relay is in its on position;
Move main relay to off position;
Verify that the main relay is in its off position;
Verify that load power is present;
Move main relay back to its on position;
Verify that the main relay is back in its on position;
Move the auxiliary relay back to its off position;
Verify that the auxiliary relay is back in its off position;
Verify that load power is present.

It is understood that one or more of the steps above may be eliminated and/or other steps may be included, and that electronics tests including those involving the fault detector are largely independent of the electromechanical tests (of the relay mechanism) and can therefore take place before, during, or after such electromechanical tests.

If any of the above itemized steps is negative or times out, either the relay control mechanisms 146, 148, or the self destruct control 126 can be employed to remove power from the load. If the self destruct control 126 is employed, fuses 124 which are in series with the phase and neutral conductors are raised to a high temperature using a heating element such as a resistor which can be sandwiched between and used to heat the fuses until they melt. The fuses and the heating element can be located in an insulating wrapper.

Figure 3:
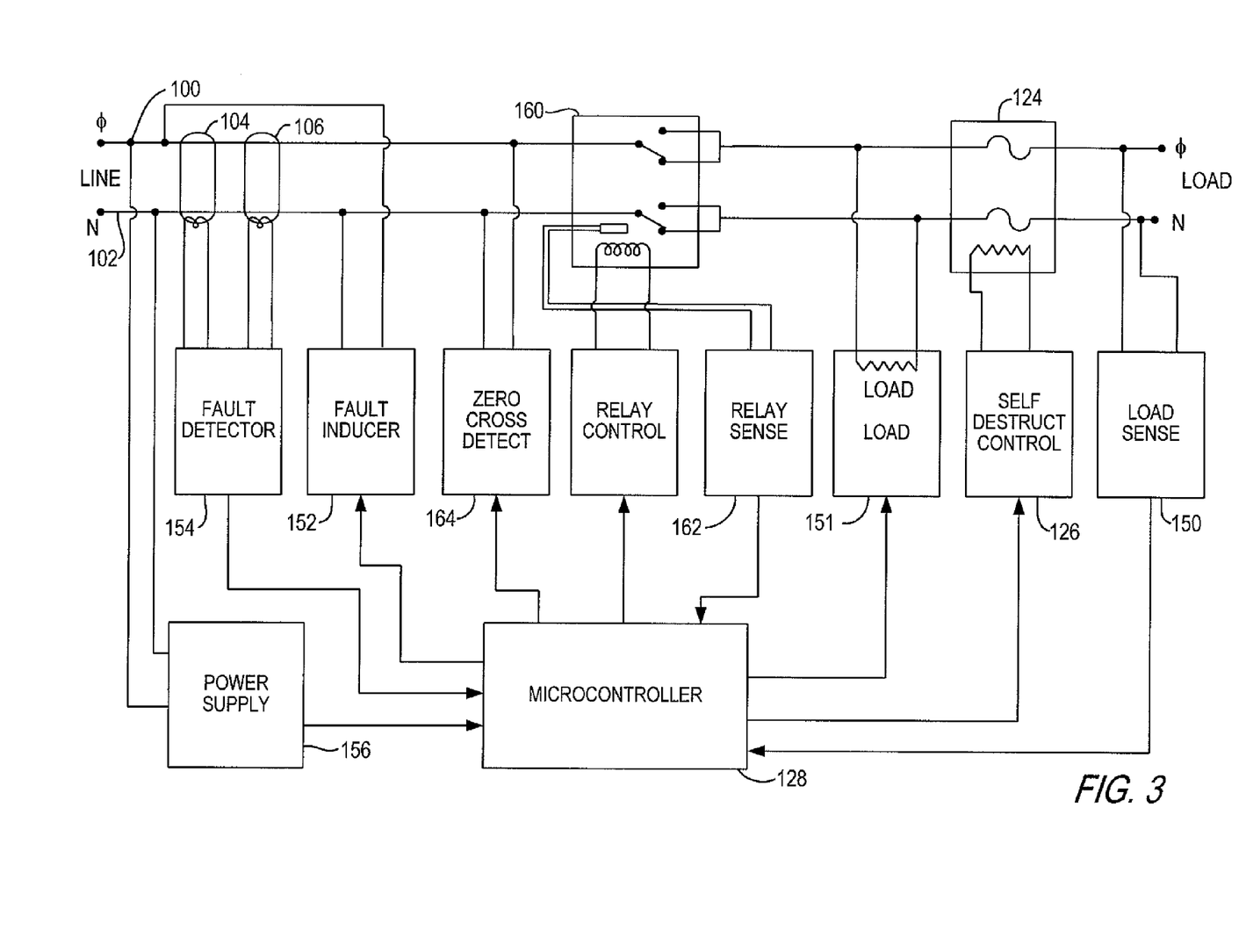
FIG. 3 is a block diagram of a second embodiment of structure in accordance with the principles of the invention.
Figure 4:
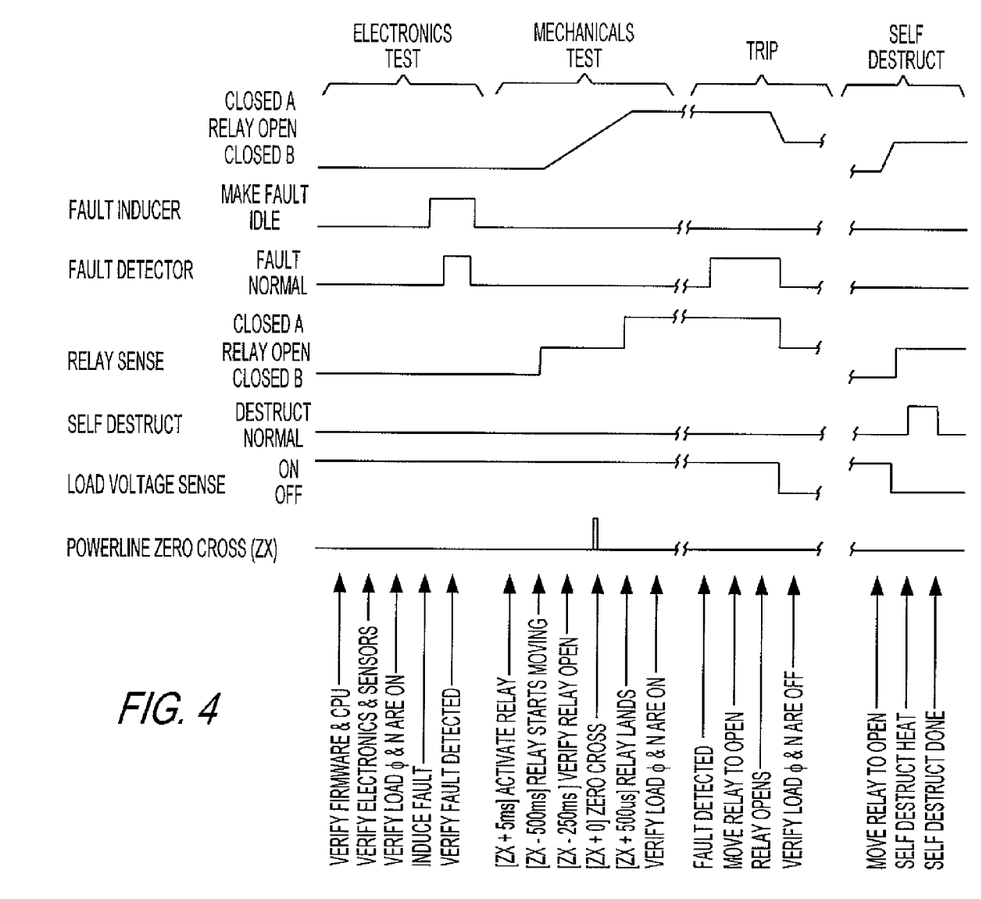
FIG. 4 is a chart of the sequence of events during operation of the autonomous periodic automated self test cycle of the embodiment of FIG. 3.

Referring to FIG. 3, there is shown the block diagram of a second embodiment of structure for autonomous periodic automated self testing a circuit interrupter; and FIG. 4 which is a chart of the sequence of events during operation of the autonomous periodic automated self test operation of the embodiment of FIG. 3. The event sequence in FIG. 4 is self explanatory and, therefore, in the interest of brevity, a further narrative description of the various steps of the cycle as shown in FIG. 4 would only be repetitious and, therefore, is not here provided. Referring to FIG. 3, the various blocks of circuits which are common with the blocks of circuits of the first embodiment shown in FIG. 1 will not again be referred to in this detailed description. In the embodiment of FIG. 3, instead of using two relays connected in parallel, a single relay is used which has a center off position and two conducting positions where each position is connected to the same load. This embodiment allows a single motion to both disconnect and reconnect power to the load, thereby minimizing the time during which the load is disconnected from power. Referring to FIG. 3, the single motion is performed proximate to the power line voltage zero cross. A self test sequence consists of moving the relay contacts from one conducting position to the other. Relay sense 162 is employed to verify the relay indeed moved from one conducting position to the other. The slight abnormality of the voltage waveform at the load will not disturb equipment connected to the load conductors, and is detected by load sense 150 to verify proper relay operation. To accommodate capacitive loads, which would slow down rapid changes of voltage, load load 151 is activated by microcontroller 128 as needed to bleed excess charge off the load thereby allowing load sense 150 to accurately detect the slight abnormality of the load voltage waveform. The time delay between electronics activation of the relay and its eventual movement may be design characterized, factory calibrated, and/or automatically adaptively adjusted after installation. Together with power line voltage zero cross detector 164, relay movement is precisely controlled to occur proximate to the zero cross. Damping means may be employed to reduce contact landing bounce. LED emitter/detector pairs, hall sensors, or the load voltage waveform itself may be employed to sense relay position. An additional load (for example load load 151) may be applied downstream of relay mechanism 160, either briefly or continuously, to negate load capacitance while sensing load voltage.

Figure 5:
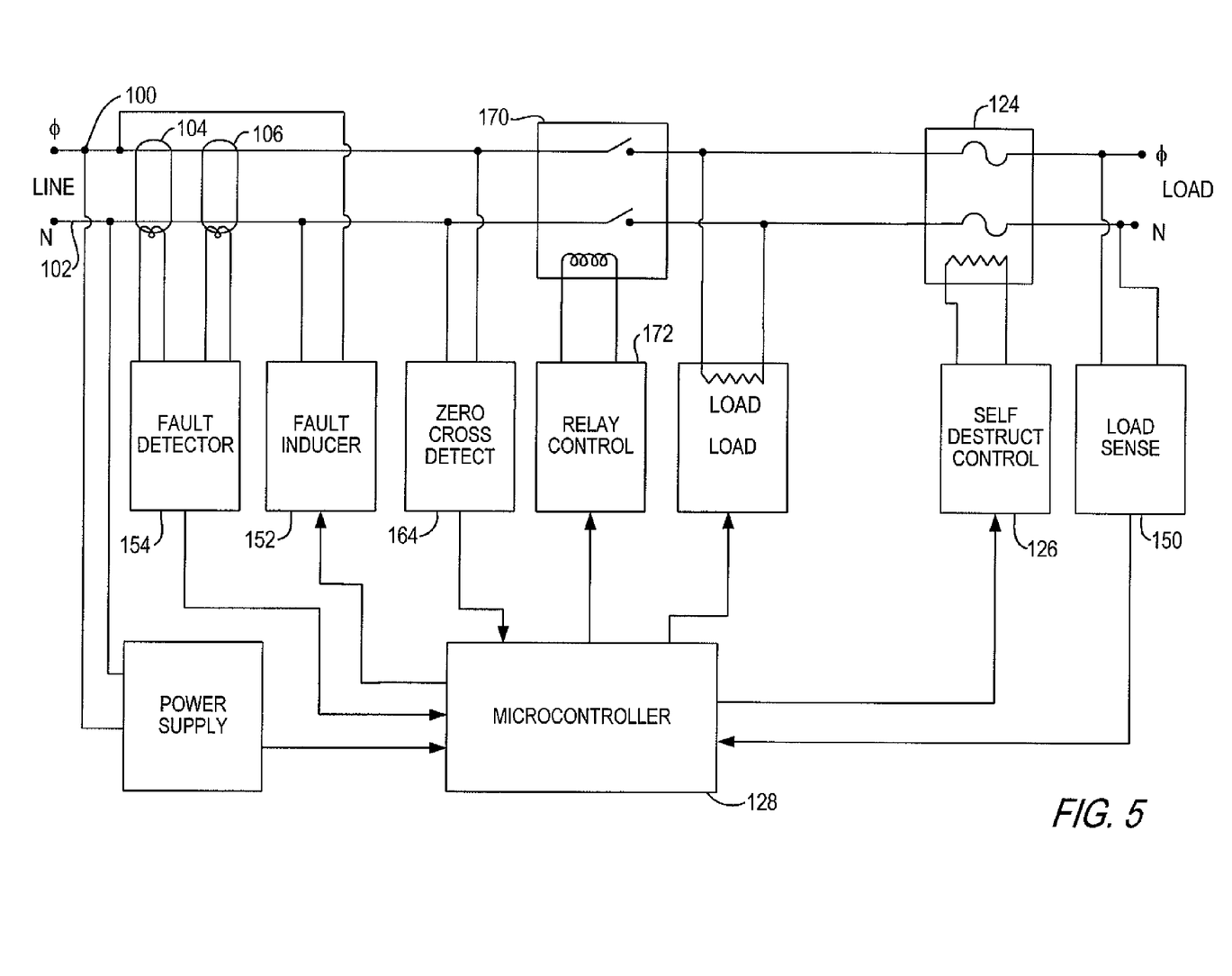
FIG. 5 is a block diagram of a third embodiment of structure in accordance with the principles of the invention.
Figure 6:
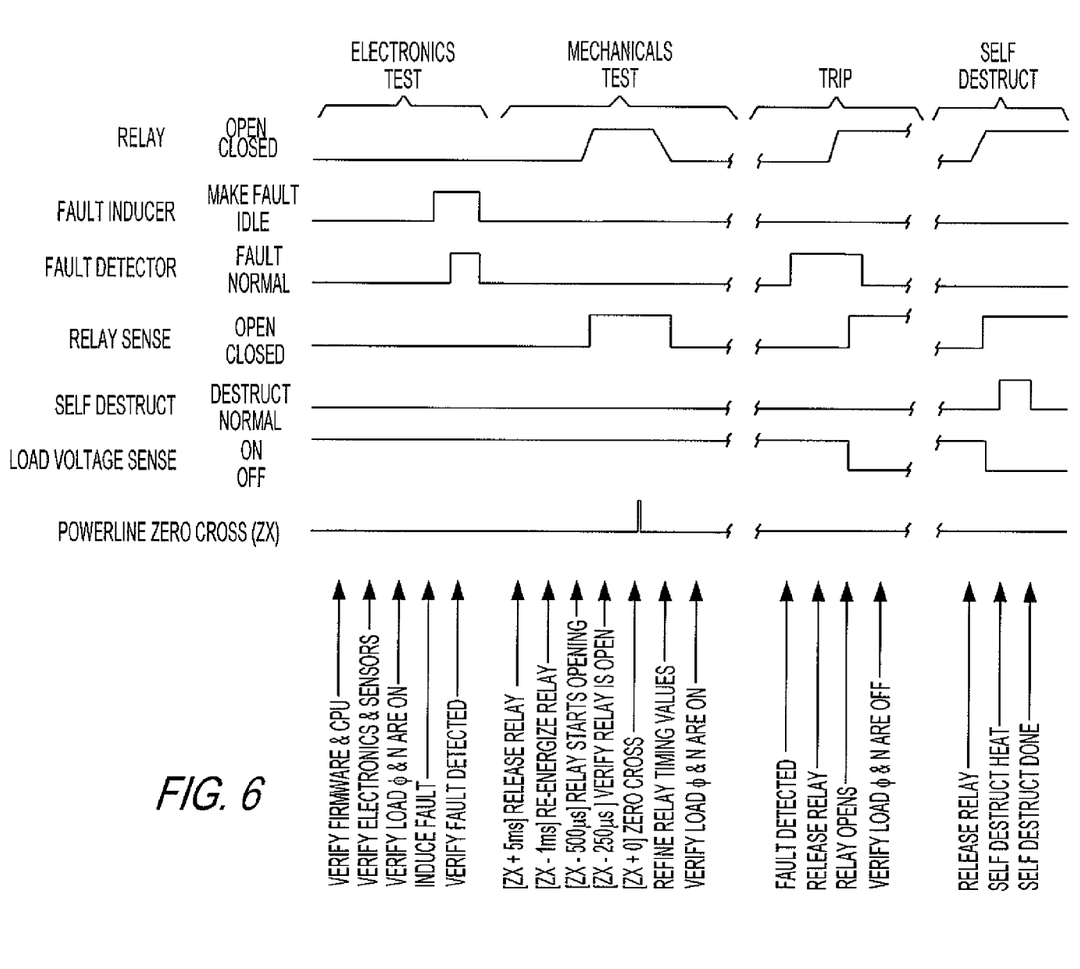
FIG. 6 is a chart of the sequence of events during operation of the autonomous periodic automated self test cycle of the embodiment of FIG. 5.

Referring to FIG. 5, there is shown the block diagram of a third embodiment of structure for autonomous periodic automated self testing a circuit interrupter; and FIG. 6 which is a chart of the sequence of events during operation of the autonomous periodic automated self test operation of the embodiment of FIG. 5. The event sequence in FIG. 6 is self explanatory and, therefore, in the interest of brevity, a narrative description of the various steps of the cycle as shown in FIG. 6 would only be repetitious and, therefore, is not here provided. Referring to FIG. 5, the various blocks of circuits which are common with the blocks of circuits of the first embodiment shown in FIG. 1 will not again be referred to in this detailed description. In the embodiment of FIG. 5, a single relay 170 and precise timing are employed. A single test sequence, see FIG. 6, consists of causing a brief "hiccup" motion in the relay 170 by using the relay control 172 to disconnect and immediately thereafter reconnect power to the load. This motion is performed proximate to the power line voltage zero cross which is determined by zero cross detector 164. The slight abnormality of the voltage waveform at the load should not disturb connected equipment, and can be detected by load sense 150 to verify proper relay operation. When using this embodiment, it should be noted that a relay that is continuously held at its near closed position may need a greater force to close than is needed to open. Additionally, regardless of the style of relay used, relay electromechanical characteristics may require that the reconnect signal is issued to the relay before the disconnect signal has caused a disconnect. The time delay between electronics activation of the relay and its eventual movement may be design characterized, factory calibrated, and/or automatically adaptively adjusted after installation. Together with power line voltage zero cross detection by the circuit of box 164, relay movement can be precisely controlled to occur proximate to the zero cross. Damping means may be employed to reduce contact landing bounce. LED emitter/detector pairs, hall sensors, or the load voltage waveform itself may be employed to sense relay position. An additional load (for example load load 151) may be applied downstream of relay mechanism 170, either briefly or continuously, to negate load capacitance while sensing load voltage.

Figure 7:
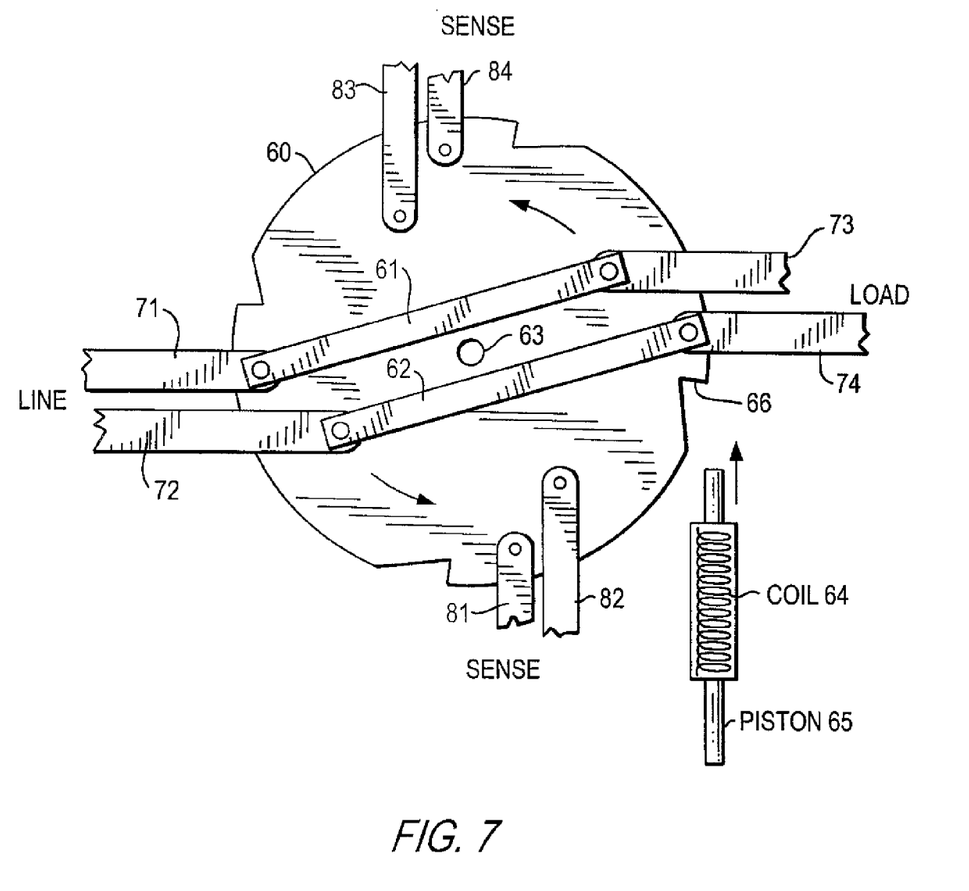
FIG. 7 is a mechanical drawing of one implementation of the main or auxiliary relay in the first embodiment in accordance with the principles of the invention.

Referring to FIG. 7, there is shown a mechanical drawing of a preferred embodiment of relay 112 or relay 134 of the first embodiment of the present invention. One important feature of this design is that current-carrying members 61, 62, on disk 60 can be verified to have moved to a non-current-carrying "off" position, and when verified to be there cannot possibly be applying power in their current-carrying "on" position. During a self test sequence, microcontroller 128 activates coil 64, sending piston 65 to hit notch 66 of disk 60. Disk 60 is forced to rotate one quarter turn about pivot 63. While "on", current-carrying members 61, 62, carry current from line terminals 71, 72, to load terminals 73, 74, respectively. While "off", current-carrying members 61, 62, carry voltage from sense terminals 81, 82, to sense terminals 83, 84, respectively.

While there have been shown and described and pointed out the fundamental features of the invention as applied to the preferred embodiments, as is presently contemplated for carrying them out, it will be understood that various omissions and substitutions and changes of the form and details of the device described and illustrated and in its operation may be made by those skilled in the art, without departing from the spirit of the invention.

What is claimed is:

1. A method for a self-test sequence of a circuit interrupting device, comprising the steps of
    inducing a trigger for a self test in the circuit interrupting device;
    moving an auxiliary relay in parallel with a main relay from its "off" position to its "on "position to maintain power to a load wherein said auxiliary relay and said main relay are coupled along the same phase;
    moving said main relay from its "on" position to its "off" position to remove power from said load after said auxiliary relay is moved to its "on" position;
    verifying that said main relay is in its "off" position;
    moving said main relay from its off position to its "on" position thereby maintaining power to said load wherein said load is coupled to both said main relay and said auxiliary relay; and
    moving said auxiliary relay from its "on" position to its "off" position after said main relay is moved to its "on" position.

2. The method of claim 1, further comprising the step of
    providing a fault detector which reports the existence of the fault prior to moving the auxiliary relay from its off position to its on position.

3. The method of claim 1, wherein the step of moving the auxiliary relay from its off position to its on position comprises the step of verifying that the auxiliary relay is in its on position.

4. The method of claim 1, wherein the step of moving the main relay from its on position to its off position comprises the step of verifying that the main relay is in its off position.

5. The method of claim 1, wherein the step of moving the auxiliary relay from its on position to its off position comprises the step of verifying that the auxiliary relay is in its off position.

6. The method of claim 1, wherein the step of moving the main relay from its off position to its on position comprises the step of verifying that the main relay is in its on position.

7. The device as in claim 1, wherein said load is uninterrupted.

8. The device as in claim 1, wherein said load is interrupted for such a short period of time as to not disturb said load.

* * * * *

UNITED STATES PATENT AND TRADEMARK OFFICE
CERTIFICATE OF CORRECTION

| | | |
|---|---|---|
| PATENT NO. | : 7,852,606 B2 | Page 1 of 1 |
| APPLICATION NO. | : 11/466744 | |
| DATED | : December 14, 2010 | |
| INVENTOR(S) | : Mernyk et al. | |

It is certified that error appears in the above-identified patent and that said Letters Patent is hereby corrected as shown below:

In column 8, line 19 after the word "the", please change "device" to correctly read: --method--.

In column 8, line 21 after the word "the", please change "device" to correctly read: --method--.

Signed and Sealed this
Fourth Day of October, 2011

David J. Kappos
*Director of the United States Patent and Trademark Office*